Figure 1:
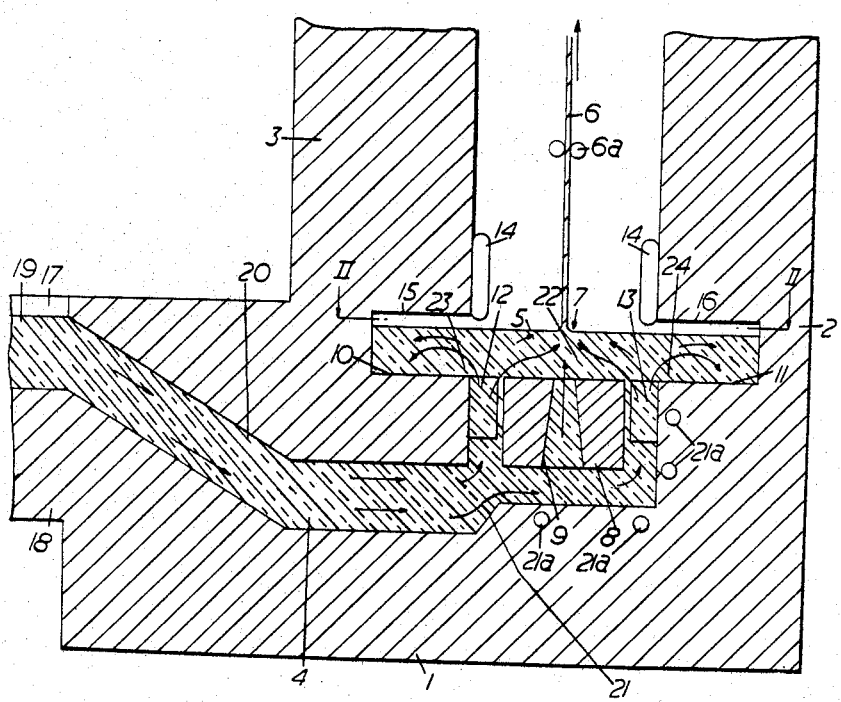

July 11, 1967 G. H. OXLEY ETAL 3,330,636
METHOD FOR DIVERTING FLOW CURRENTS IN A GLASS DRAWING POT
Filed Dec. 2, 1963 4 Sheets-Sheet 3

George Huntley Oxley and
Clenis Cail
Inventors

By Morrison, Kennedy & Campbell
Attorneys

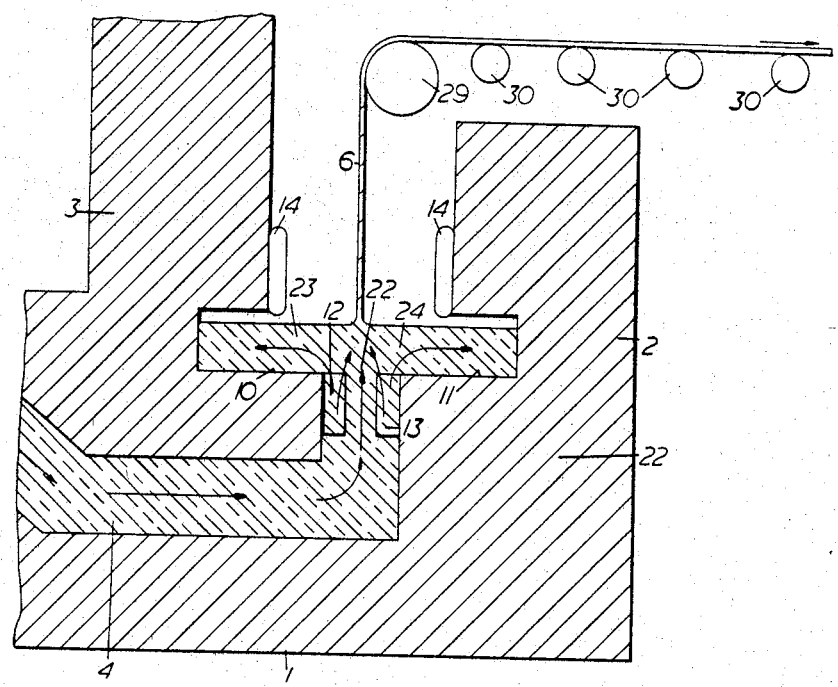

3,330,636
**METHOD FOR DIVERTING FLOW CURRENTS
    IN A GLASS DRAWING POT**
George Huntley Oxley and Denis Cail, St. Helens, England, assignors to Pilkington Brothers Limited, Liverpool, England, a corporation of Great Britain
       Filed Dec. 2, 1963, Ser. No. 327,437
Claims priority, application Great Britain, Dec. 5, 1962,
                  45,998/62
            4 Claims. (Cl. 65—90)

This invention relates to the drawing of glass in sheet form upwardly from the surface of a body of molten glass in a drawing chamber.

It is well known that sheet or window glass is manufactured by drawing a sheet of glass upwardly from the surface of a body of molten glass in a drawing chamber, there being a forward flow of molten glass into the drawing chamber for incorporation into the drawn sheet. Thermal conditions are such as to engender at the same time a return flow of cooled glass which has been in contact with refractories, and this return flow carries the cooled, refractory-contaminated glass back into the glass-melting furnace which feeds the drawing chamber.

The drawing chamber connects with the furnace through a channel along which both this forward flow and this return flow take place and it has been customary for a single glass melting furnace to supply a number of drawing chambers with identical molten glass at the same temperature along a number of such channels.

It is a main object of the present invention to improve the surface quality of drawn sheet glass by providing that the glass flowing into the drawn sheet is uncontaminated glass in which a greater degree of homogeneity is obtained than has been possible in the methods of drawing sheet glass employed hitherto.

A further object of the invention is to provide a method of drawing sheet glass from the surface of a body of molten glass which is maintained in a drawing chamber by a substantially unidirectional flow of molten glass along a canal into the drawing chamber and in which the refractory contaminated glass is segregated and is prevented from being incorporated in the cut sheet by providing a substantially laminar flow from the canal to the line of draw.

Another object of the invention is to provide for individual control of the supply of molten glass from a glass melting furnace to a number of drawing chambers so that individual control of drawing conditions can be obtained in each of the drawing chambers.

According to the invention a method of drawing glass upwardly in sheet form from the surface of a body of molten glass is characterised by feeding molten glass upwardly to the vicinity of the line of draw, shielding the body of molten glass from cooling except for an area to each side of the line of draw of superficial extent sufficient to permit flow into the line of draw of a volume of molten glass requisite to ensure continuity of drawing the sheet, engendering flow away from the line of draw of the outer layers of the rising molten glass over the shielded area to segregate said outer layers, setting up thermal flow of the glass in the segregated layers to the ends of the segregated layers, and leading the segregated glass away from the ends of the segregated layers.

Further according to the invention a method of drawing glass upwardly in sheet form from the surface of a body of molten glass, wherein uniform viscosity is maintained in the molten glass reaching the line of draw, is characterised by constraining the flow to each side of the line of draw to define two similar substantially vertically moving strata generally parallel to the line of draw, shielding the body of molten glass at the surface against heat loss by radiation on the sides of the strata away from the line of draw, regulating the volume of glass flow in each stratum to sustain flow from each inner layer of the strata to the line of draw, the inner layers emerging at the line of draw to form the main body of the sheet being drawn, segregating the outer layer of each stratum from its respective inner layer by engendering outward flow of each outer layer over the shielded area, setting up thermal flow of the glass in the segregated layers to the ends of the segregated layers and leading the segregated glass away from the ends of the segregated layers.

The outer layers of the strata include glass contaminated by contact with refractories as molten glass flows into the drawing chamber to maintain said body of molten glass, and as substantially laminar flow is maintained throughout the drawing chamber and the canal leading the glass to it, the glass in these outer layers is segregated and caused to flow to the ends of the segregated layers, and thus contaminated glass is prevented from being incorporated in the cut sheet. According to one feature of the invention the contaminated glass is tapped off from the ends of the segregated layers.

According to a further feature of the invention refractory-contaminated glass is prevented from being incorporated in the cut sheet by incorporating the contaminated glass into the margins of the sheet being drawn, so that the contaminated glass is discarded when the margins are trimmed off to produce the cut sheet. From this aspect the invention comprehends a method of drawing glass upwardly in sheet form from the surface of a body of molten glass, wherein the molten glass is shielded as it approaches the line of draw to maintain uniform viscosity in the molten glass reaching the line of draw, characterised by constraining the flow to each side of the line of draw to define two similar substantially vertically moving strata generally parallel to the line of draw, shielding the body of molten glass at the surface against heat loss by radiation on that side of the strata away from the line of draw, regulating the volume of glass flowed in each stratum to sustain a flow from each inner layer of the strata to the line of draw, the inner layers emerging at the line of draw to form the main body of the sheet being drawn, segregating each outer layer of the strata from its respective inner layer by engendering outward flow of each outer layer over the shielded area, and cooling the outflowing layer while spread over the shielded area thereby setting up a thermal flow to the ends of the segregated layers and ultimate incorporation of the cooled glass into the margins of the sheet being drawn.

A preferred method according to the invention in which glass is drawn upwardly in sheet form from a line of draw stabilised by a draw bar submerged below the surface of a body of molten glass, is characterised in that molten glass is fed upwardly to the vicinity of the draw bar and in its approach is shielded from cooling except for an area to each side of the draw bar of sufficient superficial extent to permit the volume requisite to ensure continuity in the operation of drawing the sheet from the line of draw to well up about the draw bar to the line of draw, the outer layer of the rising molten glass being segregated by flow away from the line of draw and cooled, the cooled layer achieving a temperature differential as between the middle and the ends of the segregated layer sufficient to cause the glass in the segregated layer to be directed to the ends of the draw bar so as to become incorporated in the margins of the sheet as it is formed.

Further according to the invention the rising flow of molten glass towards the line of draw is maintained by flowing a shallow layer of molten glass into the bottom of the body of molten glass, the temperature of the glass in said shallow layer being regulated as the glass advances towards said molten body. In this way the operation of each one of a number of drawing chambers supplied from the same glass melting furnace may be individually controlled.

The invention also comprehends a drawing kiln for use in the manufacture of flat glass by drawing glass upwardly in ribbon form from the surface of a body of molten glass maintained in a drawing chamber, comprising in the drawing chamber two coplanar shelves extending across the chamber in parallel relation and equidistant from the line of draw, an inlet to the drawing chamber for the molten glass entering the drawing chamber at a level below the level of the surface of the body of molten glass to maintain a rising body of molten glass in the drawing chamber, the rising body of molten glass being confined between said shelves, and means for leading away from the ends of said shelves the outer layer of said rising body of molten glass which layers flow on to and along said shelves in each direction.

A preferred drawing kiln according to the invention for use in the manufacture of flat glass by drawing the glass upwardly in ribbon form from the surface of a body of molten glass maintained in a drawing chamber, comprises an inlet to the drawing chamber for the molten glass entering the drawing chamber at a level below the level of the surface of the body of molten glass to maintain a rising body of molten glass in the drawing chamber, two coplanar shelves in the drawing chamber extending across the chamber in parallel relation and equidistant from the line of draw, the rising body of molten glass being confined between said shelves, and the ends of the shelves being inturned to effect a mutual approach towards the line of draw so that the outer layers of said rising body of molten glass flow on to and along said shelves in each direction to the inturned ends of the shelves to be incorporated in the margins of the sheet as it is drawn.

Instead of incorporating the outer layers of the rising body of molten glass in the margins of the drawn sheet, said outer layers may be tapped off from the drawing chamber, and from this aspect the invention comprehends a drawing kiln for use in the manufacture of flat glass by drawing the glass upwardly in ribbon form from the surface of a body of molten glass maintained in a drawing chamber, comprising in the drawing chamber two coplanar shelves extending across the chamber in parallel relation and equidistant from the line of draw, an inlet to the chamber for molten glass entering the drawing chamber at a level below the level of the surface of said body of molten glass to maintain a rising body of molten glass confined between the edges of said coplanar shelves, and outlets for molten glass from the drawing chamber at each end of each coplanar shelf so that the outer layers of said rising body of molten glass flowing on to and along said shelves in each direction are tapped off from the chamber through said outlets.

Preferably the outlets are heated platinum tubes, so that the cooled glass reaching the ends of the shelves flows away readily through the outlets.

In another embodiment of the invention a drawing kiln for use in the manufacture of flat glass by drawing the glass upwardly in ribbon form from a line of draw stabilised at the surface of a body of molten glass by a submerged draw bar, comprises in the drawing chamber two coplanar shelves formed of refractory material extending across the chamber in parallel relation and equidistant from the line of draw, the ends of the shelves being inturned to effect a mutual approach to the ends of the draw bar, an inlet to the chamber for the molten glass entering the drawing chamber at a level below the level of the draw bar, the spacing of the edges of the shelves from the contiguous edge of the draw bar being such as to permit the requisite volume of molten glass to well up between the draw bar and the shelves to achieve a surface level above the draw bar, the main body of the rising sheet of glass being formed by glass flowing against the edges of the draw bar directly to the line of draw, while the glass flowing against the edges of the shelves moves on to and along both shelves in each direction to the respective inturned ends of the shelves and then on to the draw bar to be incorporated in the margins of the sheet as the sheet is being formed.

Preferably the inlet to the drawing chamber comprises a shallow channel which extends towards the drawing chamber at a height such that the surface level of molten glass flowing along the channel is the same as that of the surface of said body of molten glass, and the canal then slopes downwardly to feed said molten glass into the bottom of the drawing chamber. Because molten glass is fed to the drawing chamber through a shallow channel there is substantially laminar flow of the glass in the channel and this laminar flow is maintained in the body of molten glass rising in the drawing chamber.

The invention also comprehends an installation for drawing sheet glass, comprising a glass melting furnace having an outlet for refined molten glass, and a plurality of drawing kilns as described above, spaced around and communicating with said outlet.

Figure 2:
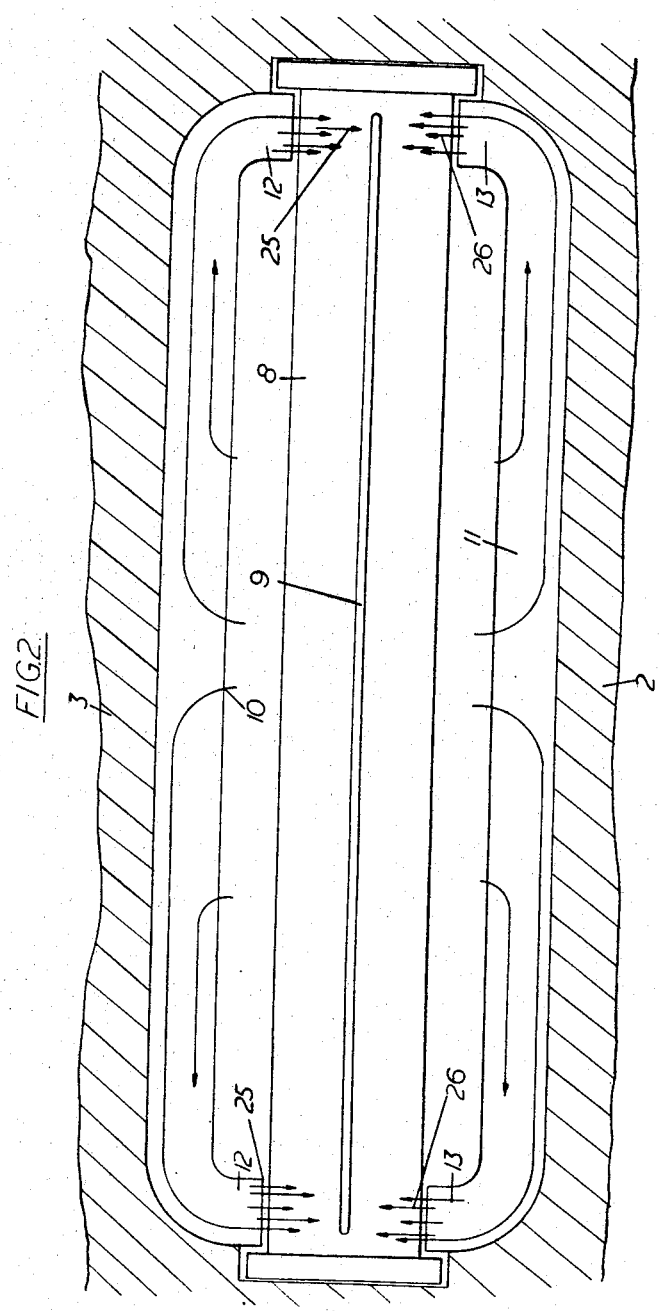
Figure 3:
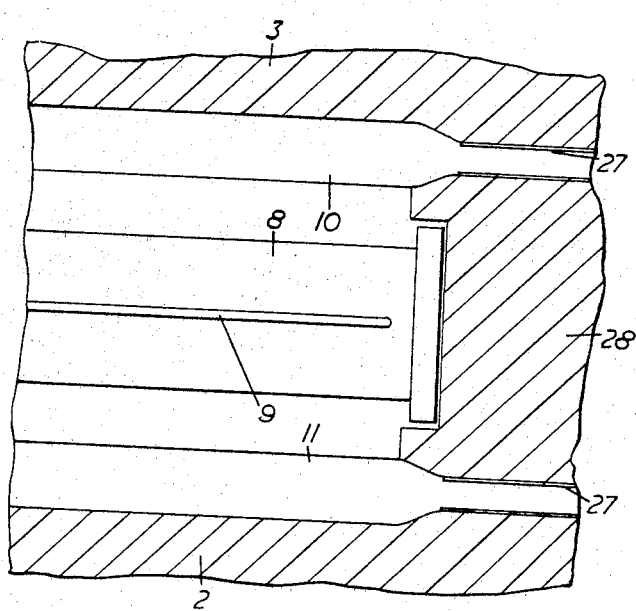

In order that the invention may be more clearly understood, some embodiments thereof will now be described, by way of example, with reference to the accompanying drawings, in which:

FIGURE 1 is a vertical cross section through a drawing kiln according to the invention, FIGURE 2 is a section on line II—II of FIGURE 1, FIGURE 3 illustrates a modification of the drawing kiln of FIGURES 1 and 2, and FIGURE 4 is a vertical cross section through a drawing kiln according to the invention for the drawing of glass by the Colburn process.

In the drawings like references indicate the same or similar parts.

Referring to FIGURES 1 and 2 of the drawings, a drawing kiln for use in the manufacture of flat glass by vertically drawing glass upwardly in ribbon form from the surface of a body of molten glass, includes a drawing chamber defined by a refractory floor 1 and refractory side walls 2 and 3. The walls 2 and 3 and the floor 1 are thick so as to provide thermal insulation and prevent any substantial cooling of the glass in the drawing chamber, and the side wall 3 shields the glass in the chamber from the heat of the furnace from which molten glass is flowed along a canal to the drawing chamber.

The lower edge of the wall 3 defines with the floor 1 of the drawing chamber, an inlet 4 for molten glass entering the chamber. This inlet 4 is at a level below the level of the surface 5 of the rising body of molten glass in the drawing chamber, from which surface 5 a sheet of glass 6 is drawn. The line of draw is indicated at 7, and is stabilised at the surface 5 of the body of molten glass by a submerged draw bar 8 formed in well-known manner with a central tapered slot 9. The sheet of glass 6 is drawn upwardly by rollers 6a into a vertical annealing tower in well-known manner.

The walls 2 and 3 of the drawing chamber are recessed at the level of the draw bar 8 to form two coplanar shelves 10 and 11 of refractory material extending across the chamber in parallel relation and equidistant from the line of draw. The ends of the shelves 10 and 11 are inturned as indicated at 12 and 13 respectively to effect a mutual approach to the ends of the draw bar 8. Cooling boxes 14 are provided on each side of the line of draw 7 and are mounted on the refractory walls 2 and 3 above the level of the top surfaces 15 and 16 of the recesses in the side walls.

Molten glass is flowed to the drawing chamber along a shallow inlet canal 17 which has a thick refractory floor 18 in which thermal regulators, not shown, are mounted to control the temperature of the molten glass 19 flowing along the canal. The height of the canal 17 relative to the drawing chamber is such that the surface 5 of the body of molten glass is at the required level in the drawing chamber. The end of the canal 17 is connected to the inlet 4 by a downwardly sloping tunnel 20 which feeds molten glass through the inlet 4 to the drawing chamber.

As indicated in FIGURE 1, the flow of molten glass 19 along the canal 17 and through the tunnel 20 is a unidirectional substantially laminar flow, so that there is a unidirectional flow of molten glass through the inlet 4 into the drawing chamber, and as indicated by the arrows the molten glass is fed upwardly as a laminar flow to the vicinity of the draw bar 8.

The molten glass is shielded by the lower end of the wall 3 as it approaches the draw bar 8 to maintain uniform viscosity, or substantially so, in the molten glass reaching the line of draw 7, and the floor 1 of the drawing chamber is stepped, as indicated at 21, to ensure that the rate of flow of the molten glass is the same on both sides of the draw bar 8. Heaters 21a are provided in the stepped portion 21 of the floor and in the side wall 2 to maintain the same temperature in the glass rising between the inturned ends 13 of the shelf 11 on the right-hand side of the draw bar 8, as in the glass rising between the inturned ends 12 of the shelf 10 on the left hand side of the draw bar. This compensates for any cooling of the glass flowing under the draw bar and up its right-hand side.

As the molten glass approaches the line of draw it is shielded by the recesses in the side walls from cooling by radiation from its surface except for an area to each side of the draw bar of sufficient superficial extent to permit the volume of molten glass 22 requisite to ensure continuity in the operation of drawing the sheet from the line of draw to well up about the draw bar 8 to the line of draw. The outer layers 23, 24 of the rising molten glass are necessarily cooler than the glass in the middle of the rising body of molten glass, and these outer layers 23 and 24 include glass contaminated by contact with the refractory floor 18 of the canal 17, and the refractory floor 1 and side walls 2 and 3 of the drawing chamber.

The rate at which the sheet 6 is drawn is such that these cooler outer layers 23 and 24 flow away from the line of draw on to the shelves 10 and 11 which provide cooling bodies on which the molten glass flowing away from the line of draw is cooled. The cooled glass on the shelves 10 and 11 also achieve a temperature differential as between the middle and the ends of the shelves so that the glass in the segregated outer layers 23 and 24 is directed to the ends of the shelves, and as indicated at 25 and 26 in FIGURE 2 is directed by the inturned ends 12 and 13 of the shelves to the ends of the draw bar 8 so that the contaminated glass of the segregated outer layers 23 and 24 becomes incorporated in the margins of the drawn sheet 6 as it is formed.

Effectively there are two similar substantially vertically moving strata in the flow, parallel to the line of draw, the volume of glass flowed in each stratum being regulated to sustain flow from each inner layer of the strata to the line of draw, the inner layers emerging at the line of draw to form the main body of the sheet being drawn, while the outer layer of each stratum is segregated from its respective inner layer by the outward flow of each outer layer which is engendered over the shelves 10 and 11.

Thus all refractory-contaminated glass at the sides of the rising body of molten glass is segregated and diverted to the margins of the drawn sheet, so that when the formed sheet is trimmed, the contaminated margins are returned to the melting furnace as cullet, and no contaminated glass is incorporated in the cut sheet.

Alternatively, as shown in FIGURE 3, the contaminated glass is removed from the ends of the shelves 10 and 11 by tapping-off the glass flowing to the ends of the segregated layers through outlets shown as heated platinum tubes 27 extending through the end walls 28 of the drawing chamber. The tubes 27 are maintained at a temperature higher than the temperature of the cooled glass reaching the ends of the shelves so that the viscosity of the cooled glass is lowered, and it flows readily through the tubes 27.

The application of the invention to the Colburn process is illustrated in FIGURE 4, the sheet of glass 6 drawn from the surface 5 of the rising body of molten glass being fed on rollers 30 into a horizontal annealing lehr in well-known manner. The central strata of the rising body of molten glass form the main body of the drawn ribbon of glass, as indicated by the flow lines 22, and the outer strata 23 and 24 are segregated by outward flow over the cooling surfaces of the shelves 10 and 11, and then flow along the shelves in both directions to the inturned ends 12 and 13 of the shelves which direct the cooled glass, which is contaminated by contact with refractories, into the main flow of glass forming the margins of the drawn sheet.

The drawing chamber of FIGURES 1 to 3 is customarily one of a number of drawing chambers forming part of an installation for drawing sheet glass. Each drawing chamber communicates with the outlet of the glass melting furnace of the installation by a shallow canal 17 so that there is individual control of the supply of molten glass to each drawing chamber, and individual control of the drawing conditions is obtained.

The invention also comprehends sheets of glass manufactured by any of the methods described herein, and articles worked up from such sheets.

We claim:

1. A method of drawing glass upwardly in sheet form from the surface of a body of molten glass, comprising establishing a unidirectional flow of molten glass upwardly towards the sheet forming area at a rate commensurate with the rate of upwardly drawing the glass sheet, segregating surface strata of the upward flow, which strata may contain contaminant, by shielding glass from cooling over an area to each side of the sheet forming area sufficient to cause said upwardly flowing surface strata to flow away from the inner strata of glass flowing into the line of draw, defining a surface thermal gradient path in a shallow area for the segregated surface strata thereby causing flow of the segregated glass to the ends of the segregated strata, and leading the segregated glass away from the ends of the segregated strata to prevent its return so that it does not interfere with any portion of the inner strata flow of glass into the sheet forming area.

2. A method of drawing glass upwardly in sheet form from the surface of a body of molten glass wherein uniform viscosity is maintained in the molten glass reaching the line of draw, characterised by feeding molten glass upwardly towards the sheet forming area at a rate commensurate with the rate of upwardly drawing the glass sheet, constraining the upward flow of molten glass each side of the line of draw to define two similar substantially vertically moving strata generally parallel to the line of draw, segregating the outer layer of each stratum which may contain contaminant from its respective inner layer by shielding the body of molten glass at the surface against heat loss by radiation over an area on the sides of the strata away from the line of draw sufficient to engender outward flow of each outer layer over the shielded area, regulating the rate of upward glass flow in each stratum to sustain flow from each inner layer of the strata to the line of draw, the inner layers merging at the line of draw to form the main body of the sheet being drawn, defining a surface thermal gradient path in a shallow area for the segregated outer layers to cause flow of the segregated glass to the ends of the segregated outer layers, and leading the segregated glass away from the ends of the segregated outer layers to prevent its return so that it does not interfere with any portion of the flow of the inner layers of the strata into the line of draw.

3. A method according to claim 1 characterized by directing the contaminant-containing glass into the edges of the sheet being drawn.

4. A method according to claim 1 characterized by tapping-off the contaminated glass from the ends of the segregated outer layer.

References Cited

UNITED STATES PATENTS

| | | |
|---|---|---|
| 1,538,215 | 5/1925 | Reece. |
| 1,538,229 | 5/1925 | Weaver _____ 65—165 X |
| 1,578,926 | 3/1926 | Shields _____ 65—165 X |
| 1,872,477 | 8/1932 | Mambourg _____ 65—347 X |
| 2,021,186 | 11/1935 | Kutchka _____ 65—203 |
| 2,063,842 | 12/1936 | Honiss _____ 65—347 X |

FOREIGN PATENTS 779,779   7/1957   Great Britain.

DONALL H. SYLVESTER, *Primary Examiner.*

S. LEON BASHORE, *Examiner.*

F. W. MIGA, *Assistant Examiner.*